US00RE35269E

United States Patent [19]

Comerford

[11] E Patent Number: Re. 35,269

[45] Reissued Date of Patent: Jun. 11, 1996

[54] PORTABLE COMPUTER HARD DISK PROTECTIVE REFLEX SYSTEM

[75] Inventor: Liam D. Comerford, Carmel, N.Y.

[73] Assignee: International Business Machines Corporation, Armonk, N.Y.

[21] Appl. No.: 223,789

[22] Filed: Apr. 6, 1994

Related U.S. Patent Documents

Reissue of:

[64] Patent No.: 5,227,929
Issued: Jul. 13, 1993
Appl. No.: 618,192
Filed: Nov. 26, 1990

[51] Int. Cl.[6] ..... G11B 21/20; G06F 11/00

[52] U.S. Cl. ..... 360/75; 371/48

[58] Field of Search ..... 360/75, 105, 106, 360/97.02; 371/4

[56] References Cited

U.S. PATENT DOCUMENTS

| | | | |
|---|---|---|---|
| 4,040,103 | 8/1977 | White | 360/75 |
| 4,692,915 | 9/1987 | Moriya et al. | 369/54 X |
| 4,862,298 | 8/1989 | Genheimer et al. | 360/75 X |
| 4,897,743 | 1/1990 | Kohno | 360/75 |
| 5,235,472 | 8/1993 | Smith | 360/60 |

FOREIGN PATENT DOCUMENTS

| | | | |
|---|---|---|---|
| 0175839 | 4/1986 | European Pat. Off. . | |
| 2187031 | 8/1987 | United Kingdom | 360/75 |

OTHER PUBLICATIONS

H. R. Ottesen; "Apparatus for Detecting and Correcting Excessive Vibration in a Disk File", IBM Technical Disclosure Bulletin, vol. 30, No. 6, Nov. 1987, p. 81.

*Primary Examiner*—Aristotelis Psitos
*Assistant Examiner*—James T. Wilson
*Attorney, Agent, or Firm*—Whitham, Curtis, Whitham & McGinn; Louis J. Percello

[57] ABSTRACT

A protective reflex system for a portable computer hard disk initiates protective action before the hard disk suffers the shock of an impact in the event they fall from, for example, a user's lap. A three axis accelerometer is mounted in the portable computer. The output of the accelerometer is continuously monitored by a dedicated processor. In the event of an acceleration event within a preset range of values, the dedicated processor passes a high priority interrupt to the central processing unit of the portable computer and then proceeds to park the disk heads. Alternately, the interrupt routine of the central processing unit may also cause the park operation. In addition to park operation, a brake operation may be performed by either the dedicated processor or the central processing unit.

24 Claims, 2 Drawing Sheets

PORTABLE COMPUTER HARD DISK PROTECTIVE REFLEX SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention generally relates to protection systems for computer hard disk drives in portable computers and, more particularly, to, a reflexive system for parking the heads of a hard disk and, optionally, stopping the spinning of the magnetic media platters in the event the computer is dropped.

2. Description of the Prior Art

Portable personal computers (PCs) have become more and more popular. Part of this popularity is due to providing portable computer with much the same power and features of desk top workstations. Among these features are hard disks which are now quite common in portable computers.

Portable computers are subject to forms of failure which are not a problem for desk top workstations. They can run out of power and they can be dropped. While this latter jeopardy is a threat to every component in the system, it is the hard disk drive which has the lowest threshold of failure in the event the computer is dropped. This component is so vulnerable to shock because it is dependent on the maintenance of a very small gap between the drive heads and the disk platters. The size of this gap is a key factor in the quantity of data which can be stored on the disk. In general, the smaller the gap, the more the data which can be stored. Thus, small, and hence vulnerable, gap dimensions are the rule for hard disks. The technology routinely used to obtain small gap height is aerodynamic. The head is literally flown over the platter surface to place the heads as close to the platters as possible without allowing contact. If the head were to contact the platter, the result could be both the destrucuon of the head and the removal of magnetic material (and hence data) from the platter.

Disk manufacturers recognize this hazard and attempt to address it by shock mounting their drives, by publishing the G-force limits their drives can tolerate, and by providing a position in which the heads may be "parked" in which the drive can tolerate accelerations which are far greater than are tolerable when the heads are "loaded".

The prior an addresses two kinds of events which may destroy the data integrity or hardware integrity of a hard disk. One of these event types is electrical power failure. This problem is addressed, for example, in U.S. Pat. No. 4,786,995 to Stupeck et al., U.S. Pat. No. 4,831,469 to Hanson et al., and U.S. Pat. No. 4,866,554 to Stupeck et al. In each of these patents, the energy stored in the motion of the disk heads is tapped by using the disk spindle motor as a generator. The power derived from this source is used to retract the disk head. Electromagnetic braking of the spindle is also contemplated. Provisions are made by one invention to shut down in the event of other voltage faults beside that of power failure.

The second event type is physical or mechanical impact. In U.S. Pat. No. 4,040,103 to White, an accelerometer is used to detect the magnitude and direction of a shock so that the hard disk head flying height can be adjusted. This adjustment is possible because the accelerometer is mounted on the disk driver frame while the drive itself is mounted to that frame by shock absorbers. The time delay for shock transmission supplied by the shock absorbers allows the flying height correction to be calculated prior to the shock arriving at the disk head.

In U.S. Pat. No. 4,862,298 to Genheimer et al., impact detection is used to generate a write-fault signal to the computing system. This signal is used to prevent data destruction by off-track writes and to cause head retraction in the event of severe impacts. This device relies on the fact that the read and write operations on disk drives involve sectors of significant extent so that if an impact is detected, it is very likely that it will occur in the course of a sector operation rather than at its very end. The system is thus expected to have the time required to abort the read or write operation without storing or retrieving corrupted data.

The problems with each of these techniques is that remedial action is taken after the failure or impact has occurred and may be too late to prevent damage. In the case of impact, what is needed is a system which can anticipate the possibility of impact and take protective action before the impact actually occurs.

SUMMARY OF THE INVENTION

It is therefore an object of the present invention to provide a protective reflex system for a portable computer hard disk which initiates protective action before the hard disk suffers the shock of an impact.

It is a further object of the invenuon to provide, in a portable computer, a means by which hard disk drives in the active, un-parked state may be protected from possible destruction in the event they fall from, for example, a user's lap.

According to the present invention, a three axis, quick response accelerometer is mounted in the portable computer. The output of the accelerometer is continuously monitored by a dedicated processor. In the event of an acceleration within a preset range of values close to IG, the dedicated processor passes a high priority interrupt to the central processing unit of the portable computer and proceeds to park the disk heads. The interrupt handler routine simultaneously performs those actions which that computer may need to perform to deal with the loss of disk availability.

Alternatively, the interrupt routine of the central processing unit may also perform the park operation. In addition, the dedicated processor or the central processing unit may cause a brake operation to be performed to slow or stop the rotation of the hard disk. Preferably, the park and brake operations are performed simultaneously in parallel by the dedicated processor and the central processing unit.

BRIEF DESCRIPTION OF THE DRAWINGS

The foregoing and other objects, aspects and advantages will be better understood from the following detailed description of a preferred embodiment of the invention with reference to the drawings in which.

DETAILED DESCRIPTION OF A PREFERRED EMBODIMENT OF THE INVENTION

Figure 1:
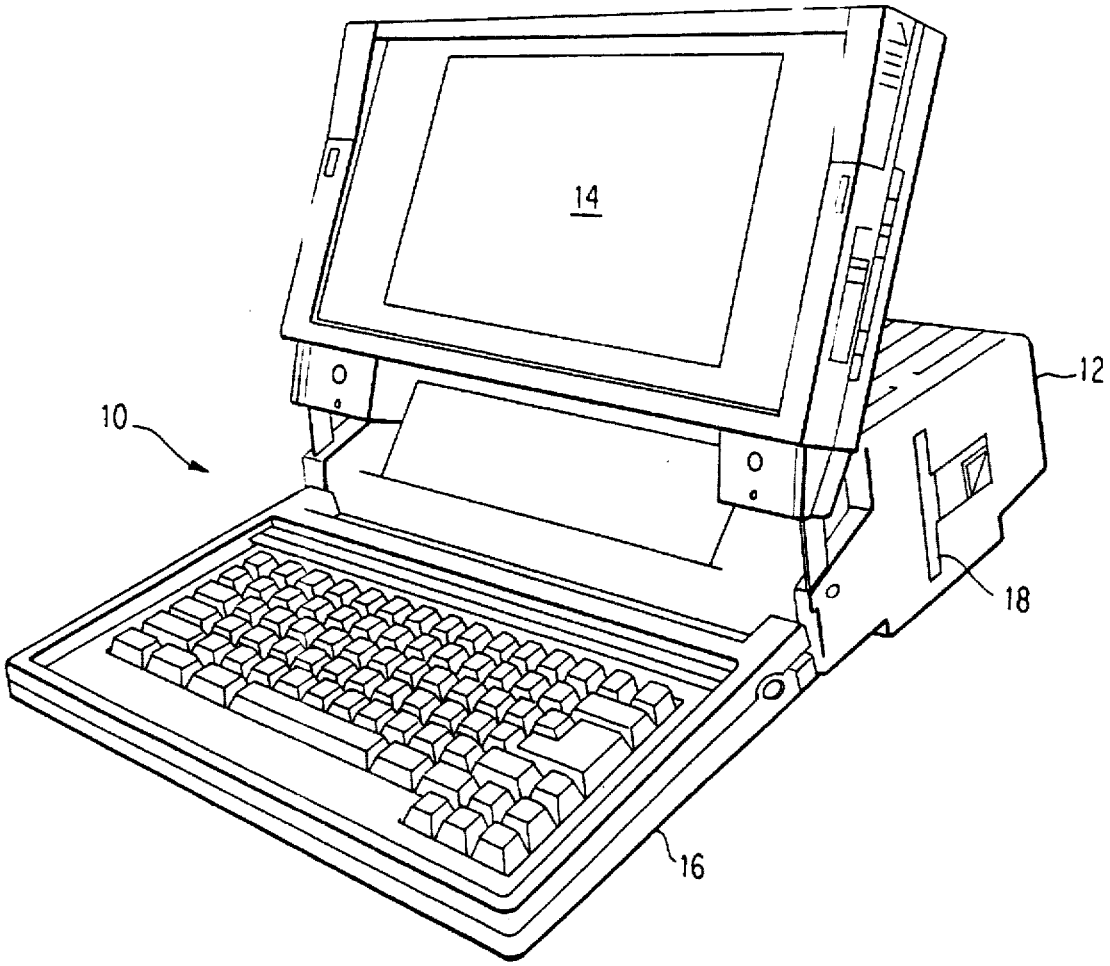
FIG. 1 is a perspective view of a portable computer of the type commonly having a hard disk.

Referring now to the drawings, and more particularly to FIG. 1, there is shown a typical portable personal computer (PC) 10, sometimes referred to a laptop computer. The configuration shown includes a system unit case 12 to which is attached a hinged liquid crystal display (LCD) 14 that folds down for attachment to a keyboard 16 for transportation. On the right side of the system case 12, there is a 3½ floppy disk drive 18 and within the case is a hard disk drive (not shown).

The portable PC shown in FIG. I is merely for purposes of illustration. Portable PCs are configured in a variety of different ways. For example, the system unit case 12 may be integrated under and in one unit with the keyboard 16 with the LCD display hinged at the back of this integrated unit. Alternatively, the system unit case 12 may be integrated behind the display 14 with the keyboard 16 detachable from the face of the display. Moreover, the display may be a gas plasma panel or other so-called "flat screen" display rather than an LCD, and while it is typical for portable PCs to have at least one floppy disk drive, such as the disk drive 18 shown in FIG. 1, the location of that disk drive may be at the front of the computer or other convenient location. The point is that no matter what the outside physical configuration of the portable computer, many are now being equipped with a hard disk drive and due to the portability of the computer, the hard disk drive is in jeopardy of damage or destruction due to the shock of an impact, such as caused by the computer being dropped.

The time required to park a disk drive head is on the order of three times the average seek time. This is in the range of 50 to 200 milliseconds. assuming that the current track is known and that the head is parked with a seek operation. The time required to fall a distance of one foot is 250 milliseconds. The present invention is a system which will protect hard disks in portable computers by sensing the IG acceleration of a fall and causing the disk heads to park in that event.

Figure 2:
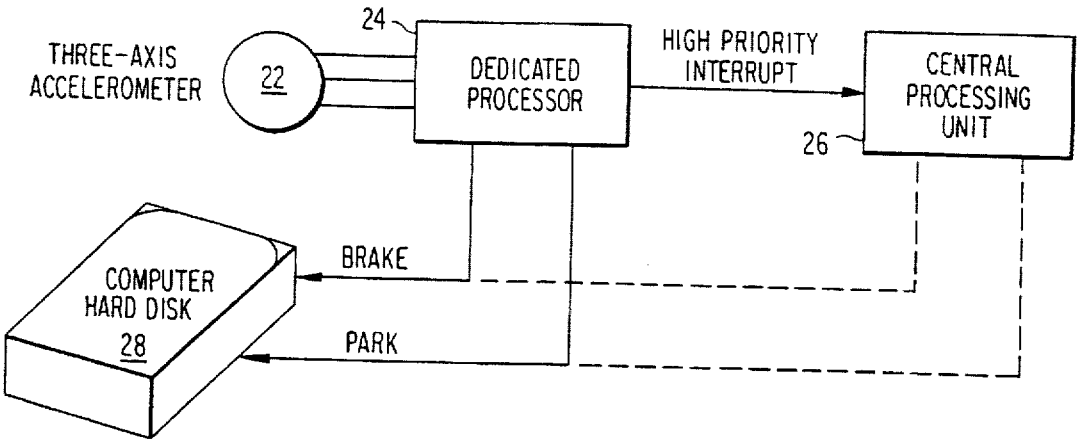
FIG. 2 is a funcnonal block diagram showing the components of the protective reflex system according to the invention.

According to the invention, a three-axis accelerometer is mounted within the computer system case 12, preferably as a component part of the hard disk and mounted to the frame of the hard disk. As shown in FIG. 2, the accelerometer 22 provides output signals for each of the three axes to a dedicated processor 24 which continuously monitors the acceleration signals, computes the resultant acceleration vector and compares the scaler magnitude of the acceleration vector with a preset range of values. The preset range is chosen to represent an acceleration that would suggest an impending impact. In the event that a value in the preset range for acceleration is calculated, the dedicated processor 24 generates a high priority interrupt to the central processor unit (CPU) 26 of the portable computer and proceeds to park the disk heads of the hard disk 28 rapidly and, optionally, to brake the hard disk's rotation. The interrupt handler of the CPU 26 simultaneously performs those actions which that computer and operating system may be able to perform to deal with the loss of disk availability. Alternatively, the interrupt routine of the CPU 26 may initiate the disk park and brake operations, as indicated by the dotted lines in FIG. 2. An advantage of having, for example, the dedicated processor 24 perform the park subroutine while the CPU 26 performs the brag subroutine is that the two subroutines can be processed simultaneously by the two processors in parallel.

Figure 3:
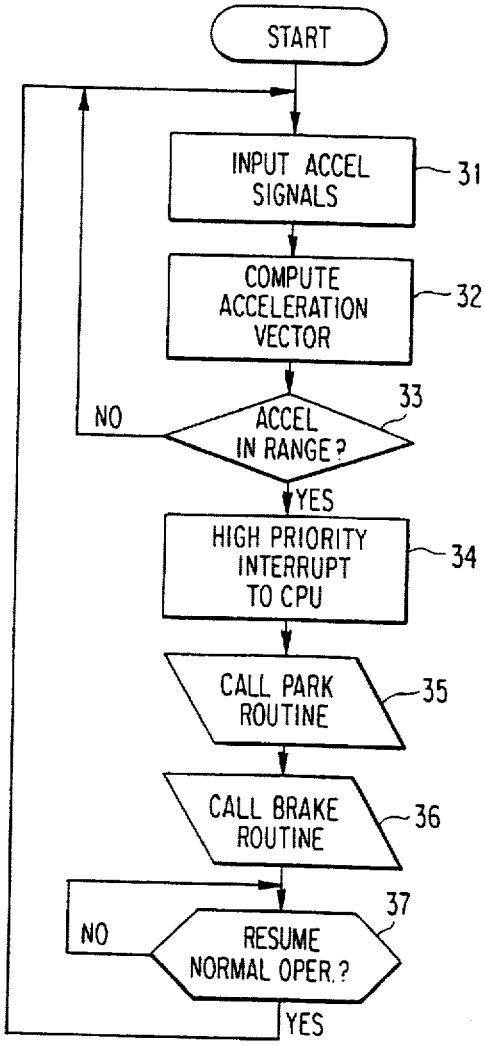
FIG. 3 is a flow diagram illustrating the logic of the computer control program for the protective reflex system of the invention.

Turning now to FIG. 3 there is shown a flow diagram of the logic of the protective reflex system just described. The process starts by inputting the three acceleration inputs to the dedicated processor 24, as represented by function block 31. The dedicated processor 24 computes the acceleration vector, as represented by function block 32. The scaler value of the acceleration vector is compared with the preset range of values in decision block 33. When the value of the calculated acceleration falls within the range continuously for a period suggesting a fall is in progress, the dedicated processor 24 generates a high priority interrupt to the CPU 26, as represented by the function block 34. In operation block 35, depending on the specific implementation of the invention, either the dedicated processor 24 or the CPU 26 calls the park subroutine which causes the heads of the hard disk 28 to be parked rapidly.

At this point in the flow diagram, the main reflexive action, i.e., parking of the heads, has been accomplished. Further action can optionally be taken to enhance the protective system according to the invention. In addition to calling the park subroutine, a motor braking subroutine may be called, as indicated by operation block 36. Again, this subroutine may be called by either the CPU 26 or the dedicated processor 2A. The system then awaits resumption of normal operations, as indicated by decision block 37. Further variations might include testing for a disk drive motor stopped condition followed by a power down procedure.

While the inention has been described in terms of a single preferred embodiment with optional features, those skilled in the art will recognize that the invention can be pracueed with modification within the spirit and scope of the appended claims.

I claim:

1. A protective reflex system for a portable computer hard disk which initiates protective action before the hard disk suffers [the] *a* shock of an impact, said hard disk [having] *including* at least [a] one head flying above at least one [motor driven] *motor-drive* rotating disk and said portable computer [having] *including* a central processing unit, said protective reflex system comprising:

a three axis accelerometer mounted in the portable computer and generating signals proportional to accelerations along three axes; and a dedicated processor for continuously monitoring said accelerometer signals and computing an acceleration vector, said dedicated processor further comparing a [scaler] *scalar* value of said acceleration vector to a preset range of values [close to 1G] corresponding to a free fall condition and passing a high priority interrupt to the central processing unit of the portable computer when said [scaler] *scalar* value falls within said preset range;

one of said dedicated processor [or] *and* said central processing unit calling a routine to park said at least one head of the hard disk [rapidly] before the hard disk suffers [the] *a* shock of an impact.

2. The protective reflex system recited in claim 1 wherein one of said dedicated processor [or] *and* said central processing unit further calls a routine to brake [the] *a* rotation of said hard disk.

3. The protective reflex system recited in claim 2 wherein said dedicated processor calls the routine to park said at least one head of the hard disk [rapidly] while said central processing unit calls the routine to brake the rotation of said hard disk, said routines *to park and to brake* being processed simultaneously in parallel by said dedicated processor and said central processing unit.

4. The protective reflex system recited in claim 1 wherein said hard disk further [has] *includes* a frame and said accelerometer is mounted on said frame.

5. The protective reflex system recited in claim 1 wherein said dedicated processor calls the routine to park said at least one head of the hard disk [rapidly].

6. A [reflexive] method for protecting a portable computer hard disk by initiating protective action before the hard disk suffers [the] *a* shock of an impact, said hard disk [having] *including* at least [a] one head flying above at least one [motor driven] *motor-driven* rotating disk, *a three-axis accelerometer and a dedicated processor* and said portable computer [having] *including* a central processing unit [and being further provided with a three-axis accelerometer and a dedicated processor], said reflexive method comprising the steps of:

monitoring, by said dedicated processor, signals from said accelerometer proportional to accelerations along three axes;

computing, by said dedicated processor, an acceleration vector and comparing a [scaler] *scalar* value of said acceleration vector to a preset range of values [close to 1G] corresponding to a free fall condition and passing a high priority interrupt to the central processing unit of the portable computer when said [scaler] *scalar* value [exceeds] *falls within* said preset range; and parking, by said dedicated processor or said central processing unit, said at least one head of the hard disk [rapidly] before the hard disk suffers [the] *a* shock of an impact.

7. The [reflexive] method recited in claim 6 further comprising the step of braking by one of said dedicated processor [or] *and* said central processing unit [the] *a* rotation of said hard disk.

8. The [reflexive] method recited in claim 7 wherein said step of parking said at least one head of the hard disk [rapidly] is performed by said dedicated processor while said step of braking the rotation of said hard disk is performed by said central processing unit, said steps *of parking and braking* being performed simultaneously in parallel by said dedicated processor and said central processing unit, *respectively*.

9. The [reflexive] method recited in claim 6 wherein said step of parking said at least one head of the hard disk [rapidly] is performed by said dedicated processor.

*10. A storage device comprising:*

*a moving storage medium;*

*at least one head positioned in transducing relationship with respect to said moving storage medium; and*

*a system for protecting the storage device, said system comprising:*

*an accelerometer, operatively coupled to the storage device, for generating a signal proportional to an acceleration of the storage device;*

*means for comparing a magnitude of said signal to a predetermined magnitude, said predetermined magnitude being associated with a shock of an impact; and*

*means for repositioning said at least one head responsive to said magnitude of said signal generated by said accelerometer being greater than said predetermined magnitude and prior to said storage device suffering a shock of an impact.*

*11. The storage device of claim 10, wherein said means for repositioning places said at least one head in a protective position.*

*12. The storage device of claim 10, wherein said means for repositioning parks said at least one head over a portion of said moving storage medium not containing data previously written to said moving storage medium.*

*13. The storage device of claim 10, wherein said means for repositioning parks said at least one head in a nontransducing position.*

*14. A storage device comprising:*

*a moving storage medium;*

*at least one head positioned in transducing relationship with respect to said moving storage medium; and*

*a system for protecting the storage device, said system comprising:*

*a three-axis sensing device coupled to the storage device, for generating a signal proportional to an acceleration of the storage device;*

*means for comparing a magnitude of said signal to a predetermined magnitude, said predetermined magnitude being associated with a shock of an impact; and*

*means for moving said at least one head positioned in transducing relationship with respect to said moving storage medium responsive to said magnitude of said signal being greater than said predetermined magnitude and prior to said storage device suffering a shock of an impact.*

*15. The storage device of claim 14, wherein said means for moving positions said at least one head to a nontransducing position.*

*16. The storage device of claim 14 wherein said means for moving parks said at least one head over a portion of said moving storage medium not containing data previously written to said moving storage medium.*

*17. A storage device comprising:*

*a moving storage medium;*

*at least one head movably positioned in transducing relationship with respect to said moving storage medium; and*

*a system for protecting the storage device, said system comprising:*

*a three-axis sensing device coupled to the storage device, for generating a signal proportional to an acceleration of the storage device;*

*means for comparing a magnitude of said signal to a predetermined magnitude, said predetermined magnitude being associated with a shock of an impact; and*

*means for stopping movement of at least one of said moving storage medium and said at least one head, responsive to said magnitude of said signal being greater than said predetermined magnitude and prior to said storage device suffering a shock of an impact.*

*18. A method of protecting data stored on a hard disk drive, said hard disk drive including at least one disk having a portion of the disk storing data, at least one transducing head positioned in transducing relation with respect to said at least one disk, an accelerometer and a microprocessor, said method comprising the steps of:*

*comparing a signal from said accelerometer to a predetermined range of levels, said predetermined range of levels being associated with a shock of an impact; and*

*moving said at least one transducing head in response to said signal from said accelerometer being within said predetermined range of levels and prior to said hard disk drive suffering a shock of an impact.*

*19. The method of protecting data of claim 18, wherein the step of moving said at least one transducing head includes a step of parking said at least one transducing head off said at least one disk.*

*20. The method of protecting data of claim 18, wherein the step of moving said at least one transducing head includes a step of parking said at least one transducing head off the portion of said disk storing data.*

*21. A storage device comprising:*

*a moving storage medium;*

*at least one head movably positioned in transducing relationship with respect to said moving storage medium; and*

*a system for protecting the storage device, said system comprising:*

*a three-axis accelerometer, operatively coupled to the storage, device, for generating a signal proportional to an acceleration of the storage device;*

*means for comparing a magnitude of said signal to a predetermined magnitude, said predetermined magnitude being associated with a shock of an impact; and*

*means for interrupting an operation of the storage device responsive to said magnitude of said signal being greater than said predetermined magnitude and prior to said storage device suffering a shock of an impact.*

*22. The storage device of claim 21, wherein said means for interrupting includes means for interrupting an operation of said at least one head.*

*23. The storage device of claim 22, wherein said means for interrupting includes means for interrupting a write operation of said at least one head.*

*24. The storage device of claim 21, wherein said means for interrupting includes means for stopping a movement of at least one of said moving storage medium and said at least one head.*

* * * * *